(12) United States Patent
Lascaud

(10) Patent No.: US 7,235,328 B2
(45) Date of Patent: Jun. 26, 2007

(54) ELECTROCHEMICAL GENERATOR ELEMENT AND CORRESPONDING BATTERY

(75) Inventor: Stéphane Lascaud, Fontainebleau (FR)

(73) Assignee: Electricite de France - Service National, Paris (FR)

(*) Notice: Subject to any disclaimer, the term of this patent is extended or adjusted under 35 U.S.C. 154(b) by 313 days.

(21) Appl. No.: 10/204,468

(22) PCT Filed: Feb. 21, 2001

(86) PCT No.: PCT/FR01/00508

§ 371 (c)(1),
(2), (4) Date: Nov. 26, 2002

(87) PCT Pub. No.: WO01/63684

PCT Pub. Date: Aug. 30, 2001

(65) Prior Publication Data

US 2003/0148172 A1 Aug. 7, 2003

(30) Foreign Application Priority Data

Feb. 22, 2000 (FR) .................................. 00 02197

(51) Int. Cl.
*H01M 10/34* (2006.01)
*H01M 4/00* (2006.01)
*H01M 6/18* (2006.01)
*H01M 4/50* (2006.01)
*H01M 4/58* (2006.01)

(52) U.S. Cl. .................. 429/60; 429/128; 429/322; 429/231.95; 429/223; 429/224; 429/231.5

(58) Field of Classification Search .............. 429/9, 429/60, 128, 322, 231.95, 231, 223, 224
See application file for complete search history.

(56) References Cited

U.S. PATENT DOCUMENTS

| | | | | |
|---|---|---|---|---|
| 4,315,061 A | | 2/1982 | Ikeda et al. | 429/161 |
| 5,840,087 A | | 11/1998 | Gozdz et al. | 29/623.3 |
| 5,902,697 A | | 5/1999 | Guindy et al. | 429/153 |
| 5,935,724 A | * | 8/1999 | Spillman et al. | 429/9 |
| 6,190,426 B1 | * | 2/2001 | Thibault et al. | 29/623.2 |
| 6,258,478 B1 | * | 7/2001 | Kim | 429/60 |

FOREIGN PATENT DOCUMENTS

| | | |
|---|---|---|
| EP | 0 298 800 | 1/1989 |
| JP | 11-307084 | 11/1999 |
| WO | WO 99 60651 | 11/1999 |

OTHER PUBLICATIONS

Patent Abstracts of Japan, vol. 2000, No. 2, Feb. 29, 2000 & JP 11 307084 A (Matsushita Electric Co., Ltd.), Nov. 5, 1999.

* cited by examiner

*Primary Examiner*—Patrick Joseph Ryan
*Assistant Examiner*—Thomas H. Parsons
(74) *Attorney, Agent, or Firm*—Sughrue Mion, PLLC

(57) ABSTRACT

The invention concerns an electrochemical generator element (102) comprising successively a first electrode layer having a polarity (114), a first electrolyte layer (110), a second electrode layer with reverse polarity (108), a second electrolyte layer (112), a second electrode layer with said polarity (116). The electrode layers of said polarity (114, 116) are connected by a parallel connection. It further comprises current collectors (118, 120) connected to the electrode layers with said polarity (114, 116). The thickness of the first electrode layer with said polarity (114) is different from the thickness of said second electrode layer with said polarity (116). The invention is applicable to lithium-polymer storage batteries.

10 Claims, 2 Drawing Sheets

ELECTROCHEMICAL GENERATOR ELEMENT AND CORRESPONDING BATTERY

BACKGROUND OF THE INVENTION

The present invention relates to an electrochemical generator element successively comprising a first electrode layer of one polarity, a first electrolyte layer, an electrode layer of a reverse polarity, a second electrolyte layer and a second electrode layer of said polarity, said electrode layers of said polarity being connected by a connection in parallel, the element further comprising current collectors, connected to the electrode layers of said polarity.

The invention is applicable, for example, to lithium-polymer electrochemical batteries for electric vehicles or steady-state applications.

Electrochemical generators with lithium having a polymer electrolyte are known. Such generators generally comprise elements consisting of two half-elements electrically connected in parallel.

Each half-element consists of a cathode layer which is applied via an electrolyte layer onto one of the two faces of a lithium layer. The current is drawn by current collectors arranged on the free surface of the cathodes and of the collecting leads connected to the lithium layer.

The cathode layers on the two sides of the lithium layer have the same thickness (FIG. 1). To increase the specific energy (energy per unit mass) of such an electrochemical generator, the thickness, which has the same value for both cathode layers, is increased. Correspondingly, the thickness of the lithium layer is also increased. This has the effect that the maximum specific power (power per unit mass) decreases as the resistance of the element increases.

SUMMARY OF THE INVENTION

The aim of the invention is to alleviate this drawback and to provide an electrochemical element in which the specific energy is substantially independent of the maximum specific power.

To this end, the subject of the invention is an electrochemical generator element of the aforementioned type, characterized in that the thickness of said first electrode layer of said polarity is different from the thickness of said second electrode layer of said polarity.

The subject of the invention is also an electrochemical battery comprising at least one electrochemical generator element of the type defined above.

BRIEF DESCRIPTION OF THE DRAWINGS

The invention will be better understood on reading the following description, given solely by way of example and made with reference to the appended drawings in which:

FIG. 3 is a cross section through a lithium-polymer electrochemical generator element according to the invention.

DETAILED DESCRIPTION OF THE INVENTION

For the effect of the invention to be better understood, the problem posed by the prior art will first of all be described with reference to FIGS. 1 and 2.

Figure 1:
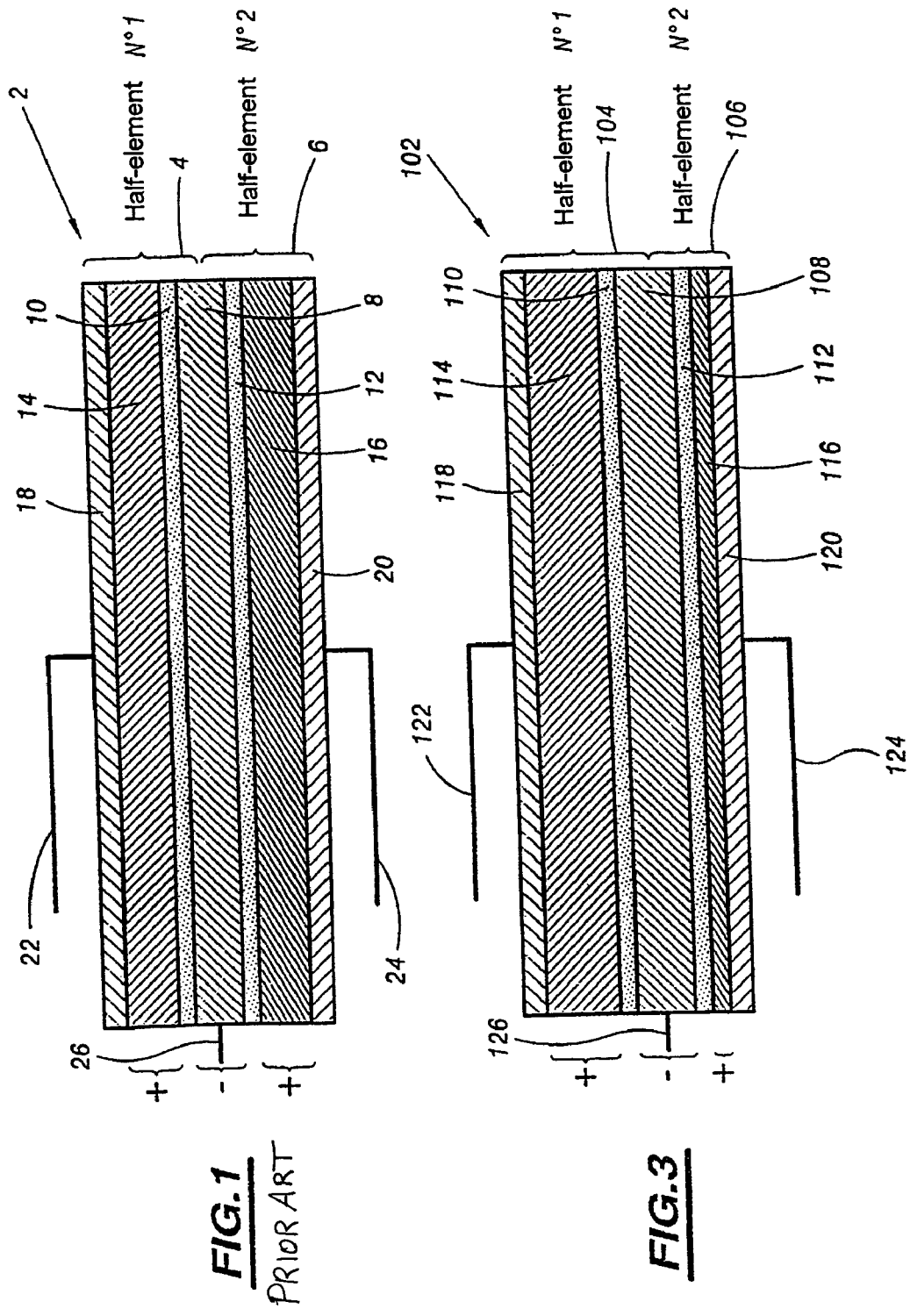
FIG. 1 is a cross section through a known lithium-polymer electrochemical generator element.

FIG. 1 shows an electrochemical generator element 2 of the prior art in cross section. The element comprises two half-elements 4, 6, each of which consists of a common lithium layer 8, an electrolyte layer 10, 12, a positive electrode layer 14, 16 and a current collector 18, 20.

Electrical conductors 22, 24 are connected to the collectors 18, 20 and an electrical conductor 26 is connected to the lithium layer 8.

Depending on the accumulator type, the conductors 24, 22 may be connected directly to the positive electrode layers 14, 16, such that the current is collected by the conductors 24, 26.

The two electrical conductors 22, 24 are connected to one side of a user (not shown), while the electrical conductor 26 is connected to the other side of the user such that a parallel connection of the two half-elements 4, 6 is formed.

The electrolyte layers 10, 12 each have a thickness of 30 μm and separate the positive electrode layers 14, 16 from the common lithium layer 8 which acts as a negative electrode.

The lithium layer has a thickness between 10 μm and 150 μm, preferably between 30 μm and 70 μm.

Each of the positive electrode layers 14, 16 has (in this example) a thickness of 90 μm and are manufactured from a material which contains a certain proportion Y of $V_2O_5$, generally more than 50%. This proportion of $V_2O_5$ determines the specific capacity which is, if Y=54%, 153 Ah/kg.

As a variant, nickel, cobalt, manganese oxide or a mixture of these oxides can be used instead of $V_2O_5$.

The internal surface resistance of a half-element is calculated by the following formula:

$$R_{s\_de} = R_{s\_Li/el} + r_{s\_el} \times e_{el} + r_{s\_cath} \times e_{cath} \qquad (1.1)$$

where $R_{s\_Li/el}$ is the surface resistance of the interface between the electrolyte 10, 12 and the lithium anode layer 8. Its value is 10 $\Omega cm^2$. $r_{s\_el}$ is the specific resistance of the electrolyte 10, 12 ($r_{s\_el}$=0.2 $\Omega cm^2$/μm). $r_{s\_cath}$ is the specific resistance of the cathodes 14, 16 at 80% discharge ($r_{s\_cath}$=3,5 $\Omega cm^2$/μm).

$e_{el}$ and $e_{cath}$ are the thickness of the electrolyte layer 10, 12 ($e_{el}$=30 μm) and the thickness of the cathode layer 14, 16 ($e_{cath}$=90 μm).

The surface resistances indicated are valid for a temperature of 90° C.

The electrical resistances of the current collectors 18, 20, and of the lithium 8 are considered to be negligible compared to the surface resistances of the interface, electrolyte and cathode.

For the given electrochemical element 2, a half-element 4, 6 therefore has the surface resistance:

$$R_{s\_de} = 10 \; \Omega cm^2 + 0.2 \; \Omega cm^2/\mu m \times 30 \; \mu m + 3.5 \; \Omega cm^2/\mu m \times 90 \; \mu m = 331 \; \Omega cm^2.$$

The internal surface resistance of such an element is calculated from the following formula (parallel connection):

$$R_{s\_e} = \frac{R_{s\_de} R_{s\_de}}{R_{s\_de} + R_{s\_de}} = \frac{R_{s\_de}}{2}$$

For the given example, the surface resistance is $$R_{s\_e} = \frac{331\ \Omega\text{cm}^2}{2} = 165.5\ \Omega\text{cm}^2$$

The maximum surface power produced by such a lithium-polymer element 2 is given by the following equation:

$$P_{s\_max} = \frac{U_0^2}{4R_{s\_e}}. \quad (1.2.)$$

where $U_0$ is the voltage in vacuo of the element 2 (2.2 V at 80% discharge).

The energy per unit area is given by the following formula:

$$E_{s\_e} = E_{s\_de1} + E_{s\_de2} = (e_{cath1} + e_{cath2}) \times \rho_{cath} \times Y \times E_s \times U_{mean} \quad (1.2.)$$

where $E_{s\_deX}$ is the surface energy of the half-element 1 or 2; $e_{cathX}$ is the thickness of the corresponding cathode, $\rho$ is the density of the cathode ($\rho$=2.1 g/cm$^3$), Y is the V$_2$O$_5$ content of the cathode in % weight (54%), $E_s$ is the specific capacity of V$_2$O$_5$ (153 Ah/kg) and $U_{mean}$ is the mean voltage of 2.55 V.

$E_{s\_e}$=7.98 mWh/cm$^2$ for the example given.

In order to increase the specific surface energy of a lithium-polymer element 2, it has already been proposed to increase the thickness of the two cathode layers 14, 16. This has the result that the surface resistance of the two half-elements 4, 6 increases while the voltage in vacuo of the elements 2 remains constant and thus the surface power and, consequently, the specific power of the element 2 decreases.

The thickness of the lithium layer remains constant.

The ratio of the maximum power of the element 2 to the specific energy of the element 2 decreases as the thickness of the cathode layers increases.

Table 1 shows, as a function of the cathode thickness, the values of surface resistance, of surface power at 80% discharge, of surface energy, the ratio of the surface power to the surface energy, the surface mass, the specific power and the specific energy. The values were measured at a temperature of 90° C.

Figure 2:
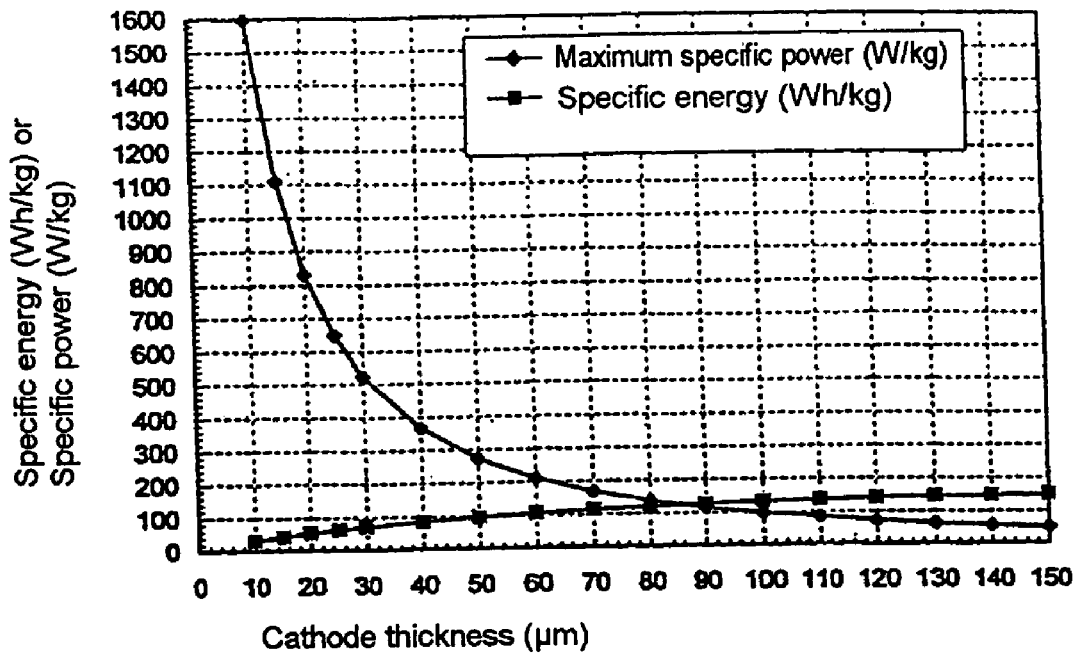
FIG. 2 shows the specific energy and the specific power of an electrochemical element of the prior art as the function of the cathode thickness.

FIG. 2 is a graph showing the specific energy and the specific power as a function of the cathode thickness of a known electrochemical element.

It is observed that an increase in the specific energy of a lithium-polymer cell by increasing the thicknesses of the two cathode layers by the same value is not possible without reducing the specific power.

Now the invention will be described with reference to FIGS. 3 and 4.

FIG. 3 shows an electrochemical generator element 102 with lithium having a polymer electrolyte according to the invention, in cross section.

In FIG. 3, elements similar to those in FIG. 1 are denoted by reference numbers increased by 100.

The electrochemical generator element 102 comprises, like the element of FIG. 1, two half-elements 104, 106 each one comprising part of a common lithium layer 108, an electrolyte layer 110, 112 and a cathode layer 114, 116 together with a layer forming a collector 118, 120.

The thicknesses of the lithium layer 108 and of the electrolyte layers 110, 112 are the same as those of the layers 8, 10 and 12 of the element 2 of FIG. 1.

However, the thicknesses of the two cathode layers 114, 116 are different from each other while their sum is equal to that of the two cathode layers 14, 16 of the element 2 of FIG. 1. The thickness of the first layer 114 is, for example, 150 μm. For this example, it may be between 130 μm and 170 μm, preferably between 140 μm and 160 μm. The thickness of the second layer 116 is 30 μm, and may be between 10 μm and 50 μm, preferably between 20 μm and 40 μm.

In general, the thicker layer may have a thickness between 80 μm and 200 μm, preferably between 100 and 160 μm.

In order to be able to compare the power and the energy of the two elements 2 and 102, the surface resistance of the element 102 will be calculated according to the invention as follows.

The electrical surface resistance of each of the two half-elements is calculated using formula (1.1.) for respective thickness values of the cathode layers 114, 116.

Here again, the electrical surface resistances of the current collectors 118, 120 and of the lithium layer 108 are considered to be negligible.

The values of the specific resistances at an operating temperature of 90° C. remain the same.

TABLE 1

| Cathode thickness μm | Surface resistance Ohm · cm$^2$ | Max. surface power mW/cm$^2$ | Surface energy mWh/cm$^2$ | $P_{max}$/energy | Surface mass Mg/cm$^2$ | Max. specific power W/kg | Specific energy Wh/kg |
|---|---|---|---|---|---|---|---|
| 10 | 25.50 | 47.45 | 0.89 | 53.53 | 29.7 | 1597.68 | 29.85 |
| 15 | 34.25 | 35.33 | 1.33 | 26.57 | 31.8 | 1110.96 | 41.82 |
| 20 | 43.00 | 28.14 | 1.77 | 15.87 | 33.9 | 830.07 | 52.30 |
| 25 | 51.75 | 23.38 | 2.22 | 10.55 | 36 | 649.49 | 61.56 |
| 30 | 60.50 | 20.00 | 2.66 | 7.52 | 38.1 | 524.93 | 69.80 |
| 40 | 78.00 | 15.51 | 3.55 | 4.37 | 42.3 | 366.73 | 83.83 |
| 50 | 95.50 | 12.67 | 4.43 | 2.86 | 46.5 | 272.48 | 95.32 |
| 60 | 113.00 | 10.71 | 5.32 | 2.01 | 50.7 | 211.20 | 104.91 |
| 70 | 130.50 | 9.27 | 6.21 | 1.49 | 54.9 | 168.89 | 113.03 |
| 80 | 148.00 | 8.18 | 7.09 | 1.15 | 59.1 | 138.34 | 120.00 |
| 90 | 165.50 | 7.31 | 7.98 | 0.92 | 63.3 | 115.50 | 126.05 |
| 100 | 183.00 | 6.61 | 8.87 | 0.75 | 67.5 | 97.96 | 131.34 |
| 110 | 200.50 | 6.03 | 9.75 | 0.62 | 71.7 | 84.17 | 136.01 |
| 120 | 218.00 | 5.55 | 10.64 | 0.52 | 75.9 | 73.13 | 140.16 |
| 130 | 235.00 | 5.14 | 11.52 | 0.45 | 80.1 | 64.14 | 143.88 |
| 140 | 253.00 | 4.78 | 12.41 | 0.39 | 84.3 | 56.73 | 147.23 |
| 150 | 270.50 | 4.47 | 13.30 | 0.34 | 88.5 | 50.54 | 150.26 |

For an element consisting of an assembly of two half-elements comprising cathode layers of 30 μm and 150 μm respectively, the calculation of the internal surface resistance of the two half-elements 104, 106 gives the following values:

$$R_{s\_de1} = 60.5 \; \Omega cm^2$$

$$R_{s\_de2} = 270.5 \; \Omega cm^2.$$

The surface resistance of the complete element 102 is calculated by the following formula relating to the parallel connection of the two elements.

$$R_{s\_e} = \frac{R_{s\_de1} R_{s\_de2}}{R_{s\_de1} + R_{s\_de2}}$$

where $R_{s\_deX}$ is the surface resistance of the half-element X ($X \in [1,2]$).

For the given assembly, the total surface resistance of the element is:

$$R_{s\_e} = 121 \; \Omega cm^2.$$

The maximum power (at 80% discharge) per unit area is then, using formula 1.2.:

$$P_{s\_max} = 10 \; \frac{mW}{cm^2}$$

The energy contained per unit area of the element 102 is calculated by the equation of formula 1.3.:

$$E_{s\_e} = E_{s\_de1} + E_{s\_de2} = (e_{cath1} + e_{cath2}) \times \rho_{cath} \times Y \times E_s \times U_{mean}$$

The ratio of the surface power to the surface energy is then:

$$\frac{P_{max}}{E_{s\_e}} = 1.52,$$

which means an increase of 60% with respect to the element of the prior art which has a ratio $$\frac{P_{max}}{E_{s\_e}} = 0.92$$

(see Table 1).

It is understood that, for an equivalent total cathode thickness (180 μm), the increase in thickness of the first cathode 114 from 90 μm to 150 μm, on the one hand, and the decrease in thickness of the second cathode 116 from 90 μm to 30 μm, on the other hand, makes it possible to decrease the internal surface resistance of the element from 160.5 $\Omega cm^2$ to 121 $\Omega cm^2$. For a constant specific energy density, since the mass and volume have not changed, the specific power is considerably increased.

Table 2 shows the surface resistances of two half-elements 114, 116 of different thicknesses for an element 102 with a total cathode thickness of 180 μm.

It furthermore shows the resulting surface resistance of the corresponding element, and the power gain with respect to an element 2 with cathode layers of FIG. 1 each having a thickness equal to 90 μm.

Figure 4:
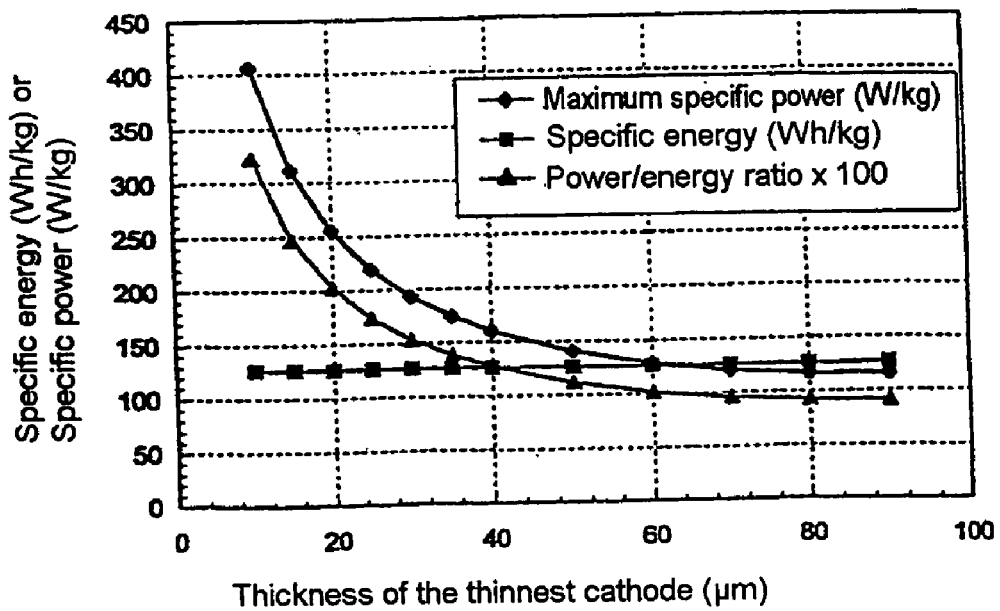
FIG. 4 shows the specific energy and the specific power of the electrochemical elements according to the invention and indicates the ratio of the two elements as a function of the cathode thickness.

FIG. 4 is a graph showing the specific power, the specific energy and the ratio between the two as a function of the thinnest cathode layer thickness for an element according to the invention, the cathode layers of which have a total thickness of 180 μm.

TABLE 2

| $d_{cath1}$ μm | $d_{cath2}$ μm | Surface resistance half-el. 1 Ohm·cm² | Surface resistance half-el. 2 Ohm·cm² | Surface resistance element Ohm·cm² | P/PO Gain % |
|---|---|---|---|---|---|
| 90 | 90 | 331 | 331 | 165.5 | 0.00 |
| 80 | 100 | 296 | 366 | 163.6 | 1.13 |
| 70 | 110 | 261 | 401 | 158.1 | 4.68 |
| 60 | 120 | 226 | 436 | 148.8 | 11.19 |
| 50 | 130 | 191 | 471 | 135.9 | 21.79 |
| 40 | 140 | 156 | 506 | 119.2 | 38.80 |
| 35 | 145 | 138.5 | 523.5 | 109.5 | 51.11 |
| 30 | 150 | 121 | 541 | 98.9 | 67.37 |
| 25 | 155 | 103.5 | 558.5 | 87.3 | 89.54 |
| 20 | 160 | 86 | 576 | 74.8 | 121.17 |
| 15 | 165 | 68.5 | 593.5 | 61.4 | 169.49 |
| 10 | 170 | 51 | 611 | 47.1 | 251.60 |

It is observed that it is possible, by increasing the thickness of one layer to 170 μm and decreasing the thickness of the other layer to 10 μm, to increase the specific power by a factor of 2.5 with respect to the able power of an element, the positive electrodes of which each have a thickness of 90 μm.

The invention therefore makes it possible to increase the specific power and, consequently, the power density available in an electrochemical generator element with lithium having a polymer electrolyte at constant specific energy.

It makes it possible to change the power to energy ratio depending on the application envisaged for a given energy density.

It is clear that the invention is not limited to the example given. The thicknesses of the electrode layers may be changed over large ranges and the sum of the thicknesses of the cathode layers is not limited to 180 μm but may also be changed.

The invention may also be applied to electricity generating cells which use positive or negative electrode materials other than lithium and polymer.

The invention may also be applied to any type of electricity generating cell with a thin-layer assembly.

As a variant, the invention may also be applied to cells having a common positive electrode layer and two negative electrode layers having different thicknesses, one layer of which is placed on each of the two sides of the positive electrode layer.

The invention claimed is:

1. An electrochemical generator element (102) successively comprising a first electrode layer of one polarity (114), a first electrolyte layer (110), an electrode layer of a reverse polarity (108), a second electrolyte layer (112) and a second electrode layer of said one polarity (116), said electrode layers of said one polarity (114, 116) being connected by a connection in parallel, the element further comprising current collectors (118, 120) connected to the first and second electrode layers of said one polarity (114, 116), characterized in that the thickness of said first electrode layer of said one polarity (114) is different from the thickness of said second electrode layer of said one polarity (116), in that the first and second electrode layers of said one polarity are positive electrode layers (114, 116), and in that the electrode layer of said reverse polarity is a negative electrode layer, in that said negative electrode layer (108) is made of lithium or of a lithium-based alloy, and said electrolyte layers (110, 112) are made of a solid polymer, and in that the thickness of said first positive electrode layer (114) is between 80 µm and 200 µm.

2. The element as claimed in claim 1, characterized in that said positive electrode layers (114, 116) are made of a composite comprising vanadium, nickel, cobalt or manganese oxide or a mixture of these oxides.

3. The element as claimed in claim 1, characterized in that the thickness of said first positive electrode layer (114) is between 130 µm and 170 µm.

4. The element as claimed in claim 3, characterized in that the thickness of said second positive electrode layer (116) is between 10 µm and 50 µm.

5. The element as claimed in claim 1, characterized in that the thickness of said second positive electrode layer (116) is between 10 µm and 50 µm.

6. The element as claimed in claim 1, characterized in that the thickness of said first positive electrode layer (114) is between 100 µm and 160 µm.

7. The element as claimed in claim 1, characterized in that the thickness of said first positive electrode layer (114) is between 140 µm and 160 µm.

8. The element as claimed in claim 1, characterized in that the thickness of said second positive electrode layer (116) is between 20 µm and 40 µm.

9. An electrochemical battery comprising at least one element according to claim 1.

10. An electrochemical generator element (102) successively comprising a first electrode layer of one polarity (114), a first electrolyte layer (110), an electrode layer of a reverse polarity (108), a second electrolyte layer (112) and a second electrode layer of said one polarity (116), said electrode layers of said one polarity (114, 116) being connected by a connection in parallel, the element further comprising current collectors (118, 120) connected to the first and second electrode layers of said one polarity (114, 116), characterized in that the thickness of said first electrode layer of said one polarity (114) is different from the thickness of said second electrode layer of said one polarity (116), in that the first and second electrode layers of said one polarity are positive electrode layers (114, 116), and in that the electrode layer of said reverse polarity is a negative electrode layer, in that said negative electrode layer (108) is made of lithium or of a lithium-based alloy, said electrolyte layers (110, 112) are made of a solid polymer and said positive electrode layers (114, 116) are made of a composite comprising vanadium, nickel, cobalt or manganese oxide or a mixture of these oxides, and in that the thickness of said first positive electrode layer (114) is between 80 µm and 200 µm.

* * * * *